United States Patent Office 2,779,336
Patented Jan. 29, 1957

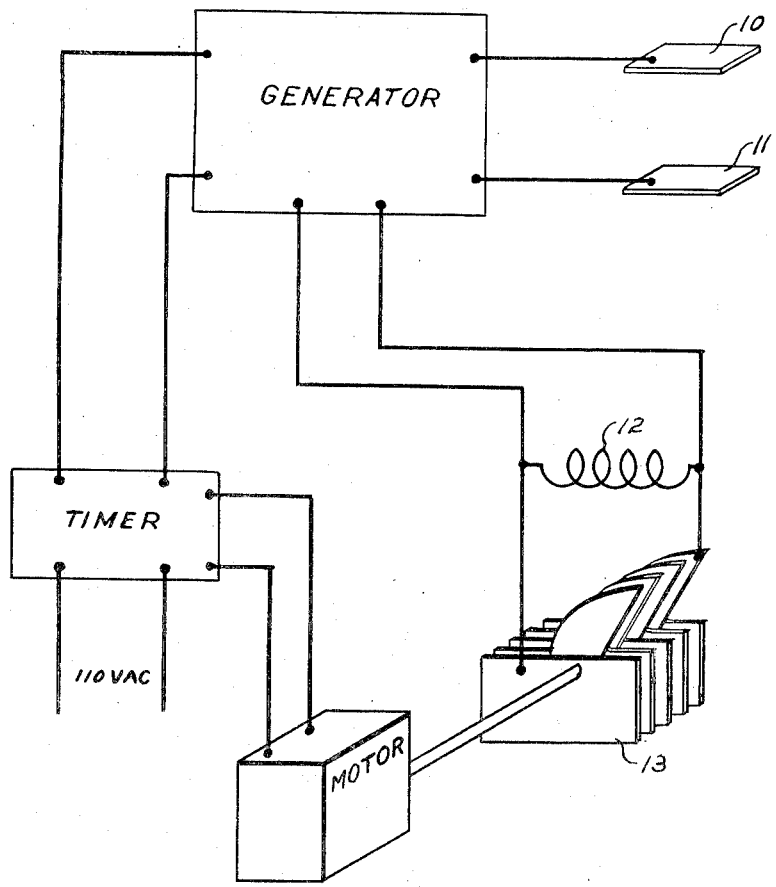

2,779,336
ELECTRO-THERAPEUTIC APPARATUS
Horace E. Abbe, Elyria, Ohio
Application July 13, 1954, Serial No. 443,113
1 Claim. (Cl. 128—422)

This invention relates to an electro-therapeutic apparatus in which the frequency of the energy transmitted to a patient is varied.

One of the objects of the invention is to provide an electro-therapeutic device having an energy output in which the frequency is gradually, uniformly, and continuously varied from a first frequency to a second frequency at a set rate of change and within a predetermined time interval.

Another object of the invention is to provide an electro-therapeutic apparatus with a frequency generator adapted to feed energy into a circuit including an antenna and a ground and also with a frequency regulating tank circuit including a variable capacitor and a motor for varying the capacitor at a predetermined rate of change to slowly vary the frequency of the output energy.

Other objects and a fuller understanding of this invention may be had by referring to the following description and claim, taken in conjunction with the accompanying drawing in which:

The figure is a schematic view of the invention.

The therapeutic apparatus as illustrated has a generator capable of developing energy in the radio frequency wave lengths. The generator may be of any suitable design such as those commonly used in commercial electro-therapeutic apparatuses. The output energy from the generator is transmitted between an antenna 10 and a ground 11 between which the patient to be treated is positioned. The frequency of the energy is controlled by the well known tank circuit which includes an inductance 12 and a variable capacitor 13. Maintaining the inductance constant and varying the capacitor varies the frequency of the energy transmitted between the antenna and the ground. When the capacitor is in one position energy of one frequency is transmitted and when the capacitor is rotated to another position energy of another frequency is transmitted.

So that all of the frequencies needed can be obtained the capacitor is varied by a motor which operates very slowly. Although any suitable motor can be used an electric motor connected to a source of power such as 110 volt alternating current through a timer is very practical. The generator in this instance may also be connected to the source of power through this same timer. This timer controls the total length of time in which the generator and the motor operate.

In operating the apparatus the operator positions the patient so that he will receive the benefit of the energy being transmitted between the antenna 10 and the ground 11. The capacitor 13 is turned to its starting position so that the initial energy being transmitted is at a predetermined starting frequency. The timer is then turned on to power the generator and the motor. The generator continues operating and the motor continues varying the condenser to vary the output frequency until the timer shuts them both off after the predetermined time. The frequency of the output energy at the time the timer disconnects the generator and motor from the source of power is called the final frequency.

Although many frequencies may be used for many illnesses it has been found that for a particular illness a starting frequency providing transmitted energy approximately three meters in length and a final frequency providing transmitting energy of approximately 4½ to 5 meters in length is very effective. It is understood that the generator and the tank circuit may provide energy of frequencies which have harmonics falling within the effective range of frequencies. The motor varies the capacitor very slowly so that it takes approximately 20 minutes to ½ hour to transmit the energy from the starting to the final frequencies.

This constant variation of the frequency output over the long period of time provides sufficient energy of the fatal frequency of the germ virus or toxin causing the illness even though that particular fatal frequency is unknown to the operator.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

An electro-therapeutic apparatus comprising, a generator type oscillator adapted to feed a patient circuit ultra high frequency energy at frequencies between and including a first frequency of a wave length of approximately three meters and a second frequency of a wave length of approximately five meters, a variable condenser controlling the frequency of said energy, a motor coupled to said condenser to uniformly, gradually, and continuously vary said condenser at a set rate of change and within a predetermined time interval to uniformly, gradually, and continuously vary the frequency of the energy from one of the frequencies to the other of said frequency in a twenty to thirty minute time interval, and means adapted to electrically connect said oscillator and said motor simultaneously to a source of electrical energy and to limit the electrical connection of the oscillator and motor to the source of electrical energy to said predetermined time interval to permit feeding energy of a particular frequency to a patient only once each time the oscillator and motor are connected to a source of energy.

References Cited in the file of this patent
UNITED STATES PATENTS

| 1,639,000 | Horton | Aug. 16, 1927 |
| 2,061,011 | Vingerhoets | Nov. 17, 1936 |
| 2,099,511 | Caesar | Nov. 16, 1937 |
| 2,381,496 | Hansell | Aug. 7, 1945 |